Dec. 27, 1960 E. D. HANSON 2,966,085
APPARATUS FOR CUTTING TACKY MATERIAL
Filed Nov. 7, 1957 4 Sheets-Sheet 1

INVENTOR.
E. D. HANSON
BY A. C. Schwarz, Jr.
ATTORNEY

INVENTOR.
E. D. HANSON

INVENTOR.
E. D. HANSON
BY A.C. Schwarz, Jr.
ATTORNEY

United States Patent Office 2,966,085
Patented Dec. 27, 1960

2,966,085

APPARATUS FOR CUTTING TACKY MATERIAL

Estyle D. Hanson, Baltimore, Md., assignor to Western Electric Company, Incorporated, New York, N.Y., a corporation of New York Filed Nov. 7, 1957, Ser. No. 695,098

1 Claim. (Cl. 83—117)

This invention relates generally to apparatus for cutting tacky material, and more particularly to apparatus for cutting out a portion from a strip of tacky material.

The invention is especially useful where it is desired to cut out a succession of portions of tacky material at predetermined intervals along the length of an advancing composite composed of a strip of tacky material adhering to a backing sheet of nontacky material.

In the copending patent application in the name of H. J. Coventry, Serial No. 695,088, filed November 7, 1957, there is disclosed a related apparatus for cutting tacky material, certain features disclosed therein being useful in conjunction with the apparatus of the instant invention.

In the splicing of communications cable, it is customary to provide a sealed housing for the spliced portion, which housing is constructed usually of two semicircular halves, which may be placed together around the spliced portion. Pieces of a tacky sealing compound are used to seal the housing and the spaces between the housing and the cable, to provide a completely sealed splice.

Suitable pieces of the tacky sealing compound are supplied customarily in a splicing package consisting of an elongated cord and two flat strips, each of the strips being approximately half the length of the cord. The two strips and the cord are wrapped in one sheet of wax paper, which paper is so folded as to prevent contact between the various tacky components in the package.

In order to mass produce such a splicing package, an advancing composite is formed, which is composed of the strip of tacky material spaced from the cord of the same material, both adhering to the upper surface of a backing sheet of wax paper. It is necessary, first, to provide an apparatus, such as the one forming the subject matter of this invention, for cutting out a succession of portions from the strip of tacky material, the cord being bypassed, at predetermined intervals along the length of the advancing composite. This cutout composite is then severed to length, midway between successive cutout portions, by a second cutter. The paper is folded over this unit and the folded unit is packaged in a suitable manner.

An object, therefore, of the invention is to provide an improved apparatus for cutting tacky material.

Another object of the invention is to provide apparatus for cutting out a portion from a strip of tacky material.

A further object of the invention is to provide apparatus for cutting out a succession of portions of tacky material at predetermined intervals along the length of an advancing composite composed of a strip of tacky material adhering to a backing sheet of nontacky material.

In the continuous cutting out of portions of tacky material from an advancing strip, it is necessary to dispose of the cutout portions.

Accordingly, it is still another object of the invention to provide a cutting apparatus so designed that successive cutout portions will be ejected from the cutting apparatus.

An apparatus for cutting out a portion from a strip of tacky material, embodying certain features of the invention, may include a rotary support and a hollow cutter mounted for rotation with the rotary support and for radial reciprocation with respect thereto. Means are provided, operable as the support rotates to carry the cutter to a position adjacent to the tacky strip, for reciprocating the hollow cutter into and out of cutting engagement with the tacky strip to cut out a portion therefrom. The cutout portion of tacky material is retained within the hollow cutter as it is reciprocated out of cutting engagement with the tacky strip. In addition, means may be provided for ejecting the cutout portion of tacky material from the hollow cutter upon further rotation of the support.

Other objects and advantages of the invention will appear from the following detailed description of a specific embodiment thereof, when read in conjunction with the appended drawings, in which.

Figure 1:
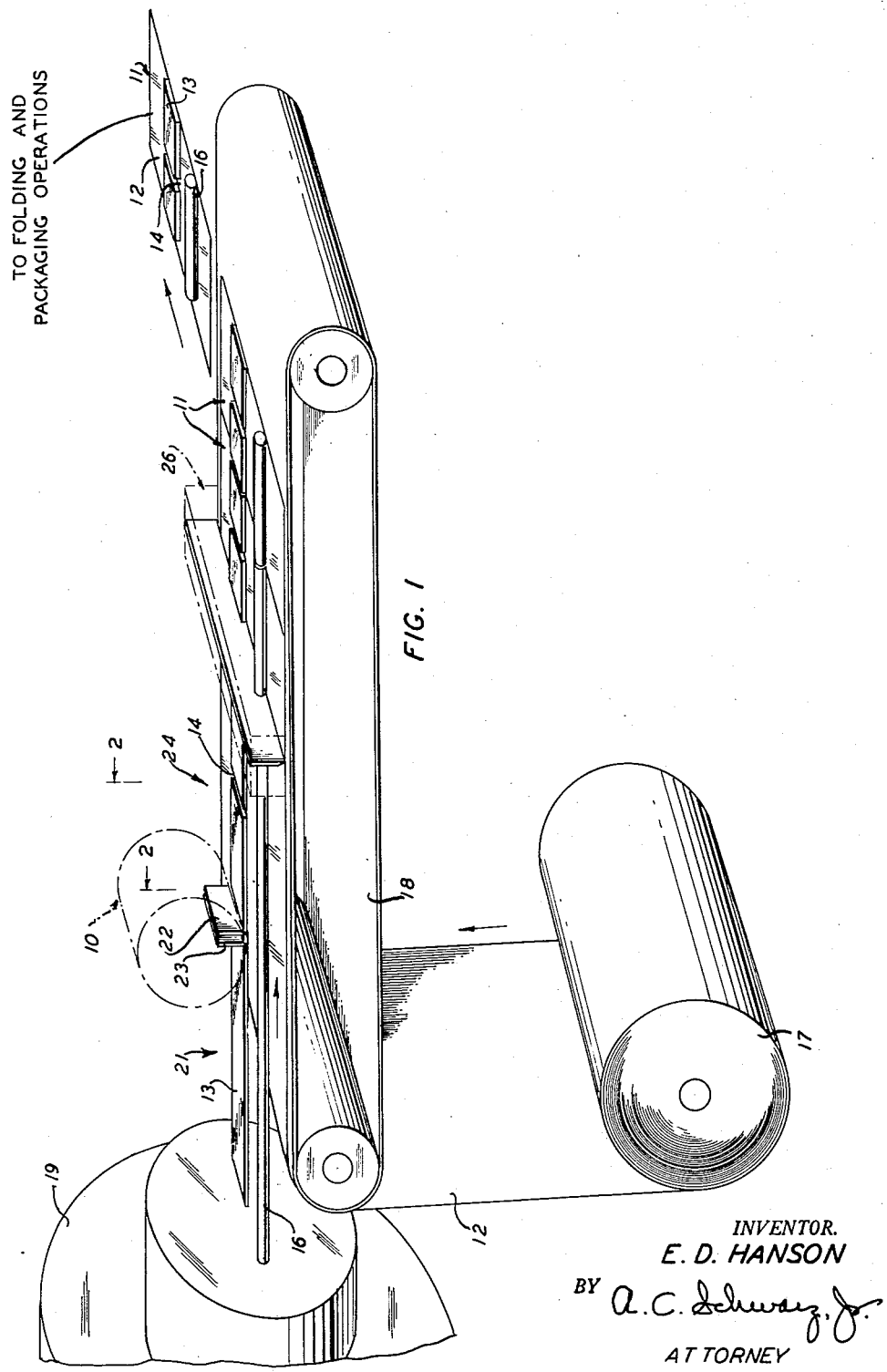
Fig. 1 is a perspective view showing generally the improved cutting apparatus in conjunction with other apparatus with which it may be used.

Referring now in detail to the drawings, and in particular to Fig. 1, the improved cutting apparatus, designated generally by the numeral 10, is shown in conjunction with other apparatus with which it may be used. The entire apparatus shown in Fig. 1 operates to form a succession of composite units 11—11, each of which is composed of a rectangular backing sheet 12 of nontacky material such as wax paper, having adhered to its upper surface a strip 13 of tacky material, having a cutout portion 14, and a tacky cord 16 of the same material.

The tacky material may be an electrical sealing compound, suitable for use in the sealing of the protective housings used in the splicing of communications cable. Such a compound may be composed of butyl rubber, carbon black and a polyisobutylene plasticizer. This material is tacky as extruded and remains so, without curing, for a relatively long period of time.

In order to manufacture continuously a series of such composite units 11—11, a backing sheet 12 of wax paper is advanced continuously from a supply package 17 onto the surface of a conveyor belt 18 for movement therewith. An extruder 19 supplies a continuous strip 13 of the tacky material and a continuous cord 16 of the same material. The strip 13 and the cord 16 are guided, in spaced relationship to each other, onto the upper surface of the backing sheet 12 to which they adhere, forming an advancing composite 21. The rate of extrusion and the rate of paper supply are synchronized by suitable means (not shown) with the speed of the conveyer belt 18, so that the composite 21 advances at a uniform rate with the conveyor 18.

The advancing composite 21 travels through the cutting apparatus 10, and, when a preselected length of the composite 21 has passed therethrough, a suitable hollow cutter, shown as a pair of spaced cutting blades 22 and 23, operates in a manner to be described in detail hereinafter, to cut out the portion 14 from the tacky strip 13 without cutting the backing paper 12. As seen, the tacky cord 16 bypasses the cutting blades 22 and 23. Thus, an intermediate composite 24, having the portion 14 removed from the tacky strip 13, is advanced beyond the cutting apparatus 10.

The intermediate composite 24 is then advanced by the conveyor belt 18 to a second cutter 26, which is synchronized with the cutting apparatus 10 to sever completely the intermediate composite 24 at a point midway between successive cutout portions 14—14, thus forming a succession of the composite units 11—11.

These composite units 11—11 are advanced next to a folding station, whereat a portion of the sheet 12 of wax paper is folded over the strip 13, another portion of the sheet 12 is folded over the cord 16, and then the unit is folded again so that the paper enclosed strip 13 lies adjacent to the paper enclosed cord 16. The folded unit is then packaged by suitable means for eventual use in cable splicing.

While the improved cutting apparatus 10 has especial utility in the manufacture of this particular product, it is generally useful whenever it is desired to cut out a portion from a strip of tacky material.

In order to facilitate an understanding of the invention, the following detailed description of the cutting apparatus 10 will consider an advancing composite 21 composed only of a strip 13 of tacky material to be cut and a backing sheet 12. It will be understood that, when the advancing composite includes another element not to be cut, such as the cord 16 before-described, only the strip 13 to be cut passes beneath the cutting blades 22 and 23, the cord 16 being bypassed, as seen in Fig. 1.

Figure 2:
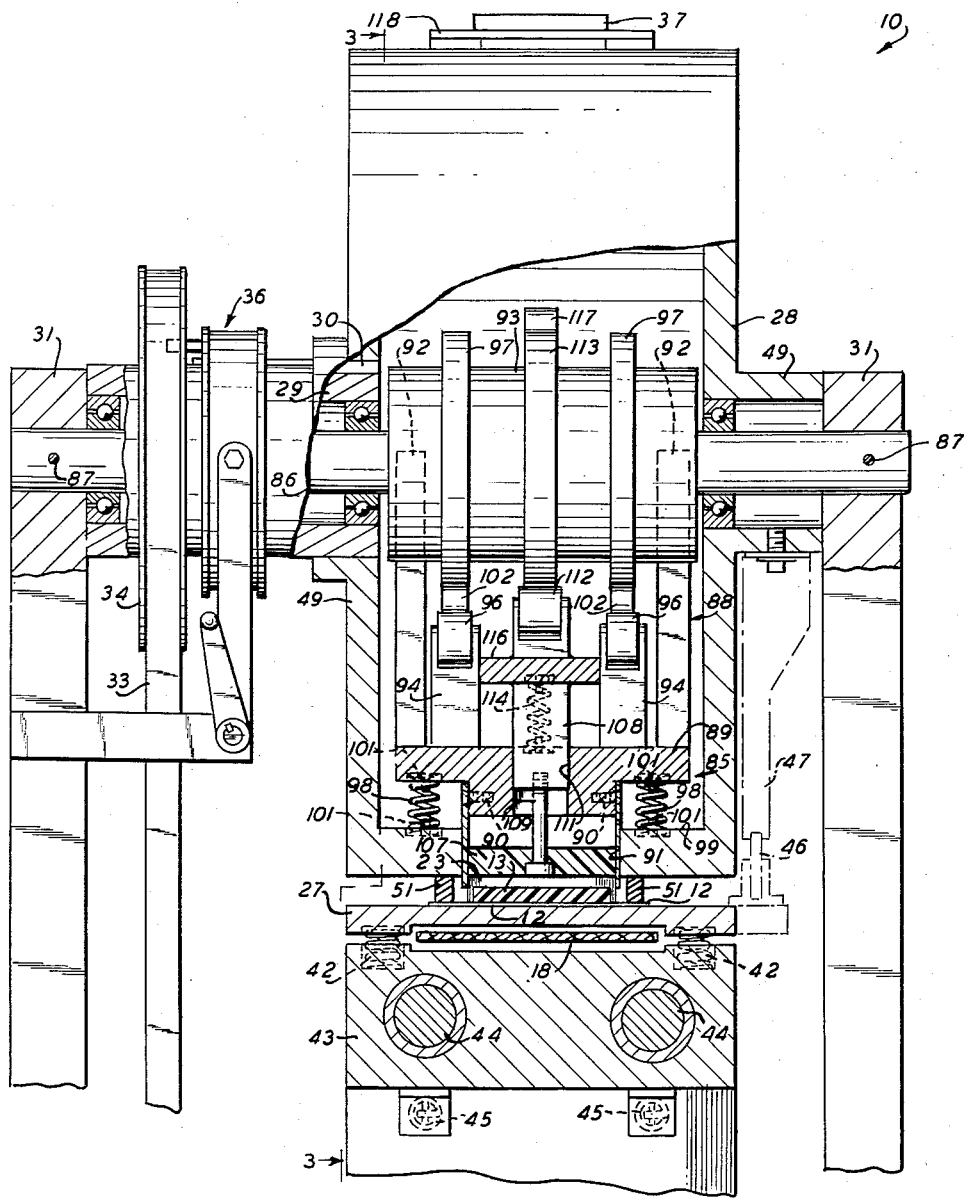
Fig. 2 is a right side elevation of the improved cutting apparatus shown in Fig. 1, taken generally along the lines 2—2 of Fig. 1, but with parts broken away for clarity.
Figure 3:
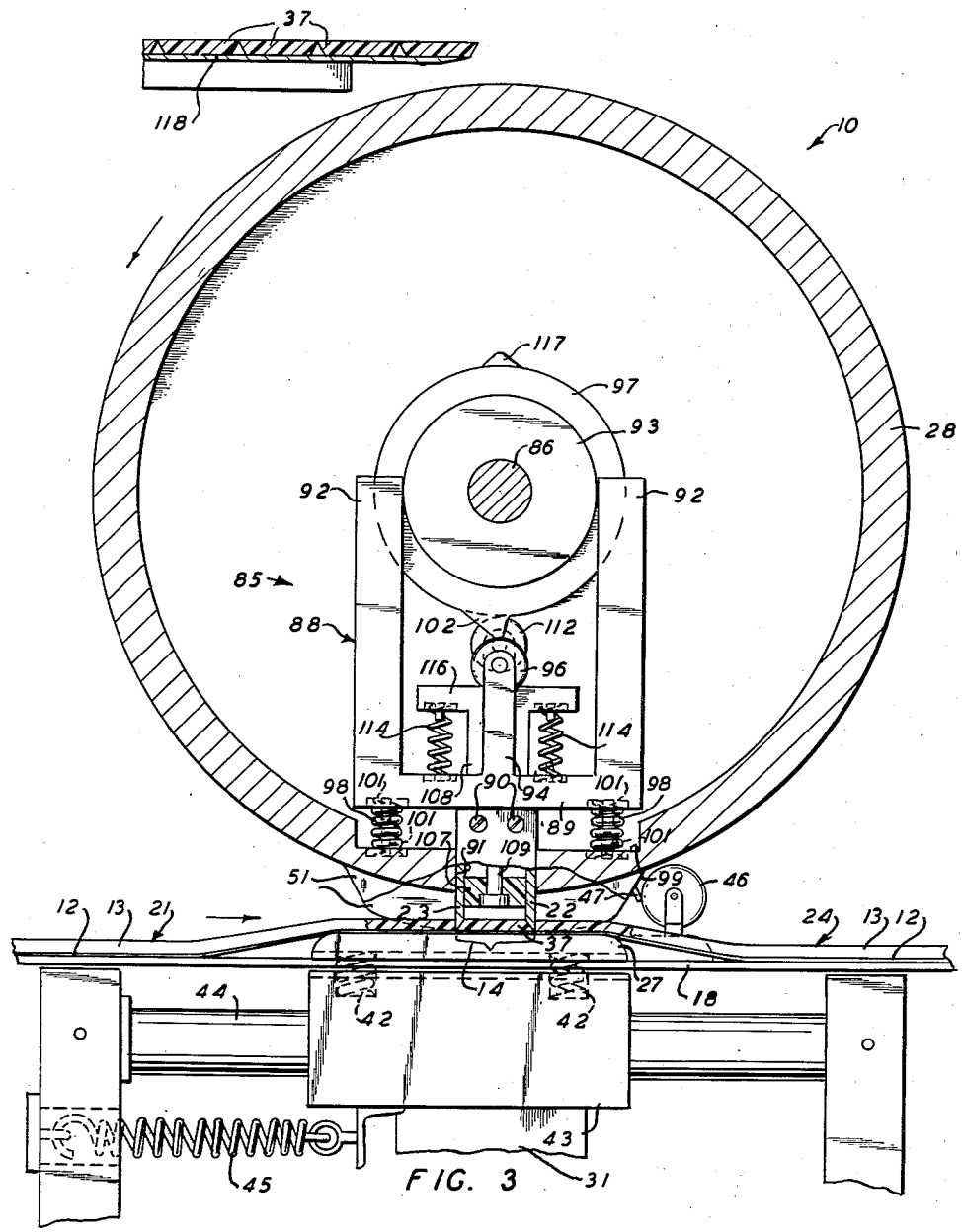
Fig. 3 is a sectional front elevation of the cutting apparatus taken along the lines 3—3 of Fig. 2, but with parts broken away to illustrate the cutting operation.
Figure 4:
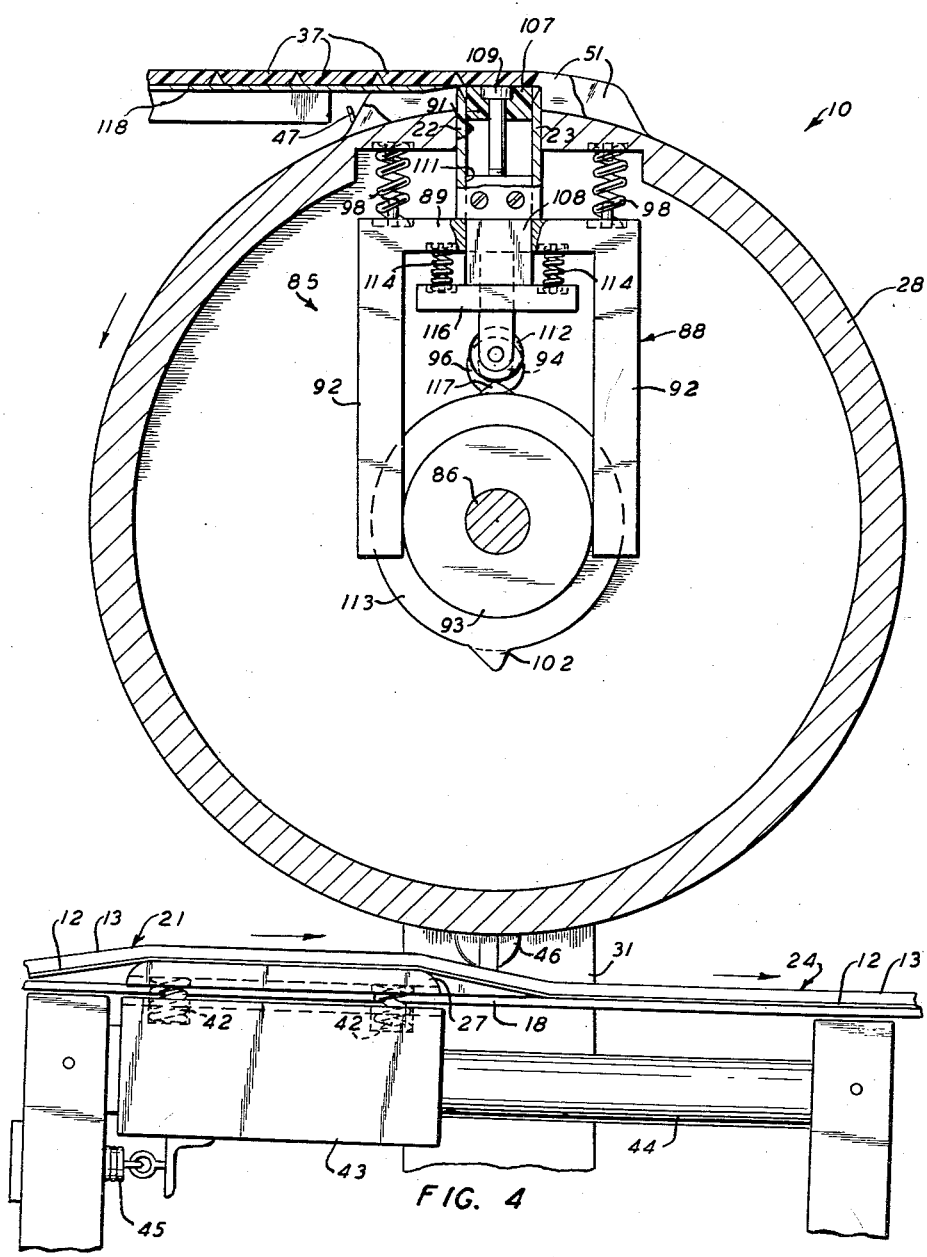
Fig. 4 is a sectional front elevation similar to Fig. 3, but with the apparatus rotated 180° from the position shown in Fig. 3 and having parts broken away to illustrate the operation of the ejector mechanism.

Referring now to Figs. 2, 3 and 4 showing the improved cutting apparatus 10 in detail, wherein Figs. 2 and 3 show the apparatus in cutting position and Fig. 4 shows the apparatus rotated 180° to ejecting position, the composite 21 is shown advancing with the conveyer belt 18 from left to right as viewed in Figs. 3 and 4 through the cutting apparatus 10. A backing plate 27 is provided, over which the advancing composite 21 travels, being separated by the backing plate 27 from the conveyer belt 18, which passes therebeneath.

As best seen in Fig. 3, after a predetermined length of the advancing composite 21 has passed over the backing plate 27, a hollow cutter, shown as a pair of spaced cutting blades 22 and 23, is operated to cut out a portion 14 from the tacky strip 13, thus forming the desired cutout composite 24. The cutout composite 24 passes off the backing plate 27 and back into engagement with the conveyer belt 18.

According to the invention, the cutting blades 22 and 23 are mounted for rotation with a hollow rotatable drum 28 and for radial reciprocation with respect thereto. Suitable means, to be described in detail hereinafter and indicated generally by the numeral 85, are provided for reciprocating the cutting blades 22 and 23 radially with respect to the rotating drum to accomplish the cutting out of the portion 14. As best seen in Fig. 2, the drum 28 is secured by a key 30 for rotation with a rotatable sleeve 29. The rotatable sleeve 29 and the drum 28 are journalled for rotation about a stationary shaft 86, which is secured at either end by a pair of pins 87—87 to a pair of support members 31—31.

The shaft 86 is mounted transversely with respect to the direction of advancement of the composite 21, and a predetermined distance above the backing plate 27, so that, as the drum 28 rotates with the sleeve 29 to carry the blades 22 and 23 to their lowest points, as depicted in Fig. 3, they will be positioned in close proximity to the advancing composite 21. At this time the cutter reciprocating means 85 will operate to extend the blades 22 and 23 a preset distance radially outward with respect to the drum 28 to cut completely through portions of the tacky strip 13, but not so far as to contact the backing sheet 12. Thus, the complete cutting out of the portion 14 from the advancing strip 13 is accomplished without the cutting of the backing sheet 12.

The drum 28 may be rotated by suitable means, such as a timing belt 33 passing around a driving pulley 34, which may be mounted on the shaft 86 adjacent to one end of the rotatable sleeve 29. A clutch 36 is provided for engaging and disengaging the rotatable sleeve 29 with and from the driving pulley 34.

The drum 28 is rotated in such direction, counterclockwise as seen in Fig. 3, that the cutting blades 22 and 23 at their lowest points travel in the same direction as the advancing composite 21. It is preferable to rotate the drum 28 in predetermined synchronism with the conveyer belt 18 so that the peripheral speed of the cutting edges of the blades 22 and 23, when extended into cutting position, is substantially the same as the speed of advancement of the composite 21. By this means, the cutting operation is facilitated, as described in detail in the before-mentioned copending application of H. J. Coventry.

After the cutting out of the portion 14 from the tacky strip 13, the cutter reciprocating means 85 operates to retract the blades 22 and 23 out of engagement with the tacky strip 13, a plug 37 of the tacky material being retained between the spaced cutting blades 22 and 23.

While the cutter has been shown as consisting of a pair of spaced blades 22 and 23, it is obvious that the cutter could be a one piece, hollow-centered cutter. This latter construction would be especially suitable if a succession of interior shapes were to be cut out, rather than a portion 14 extending the entire width of the strip 13.

Further, it would be possible to position two or more pairs of cutting blades around the drum 28, if desired, to provide different widths of, or a particular spacing between, successive cutout portions 14 by shaping and arranging properly the various sets of cutting blades.

It is preferred to mount the backing plate 27 for vertical movement on a plurality of springs 42—42, which are mounted within suitable recesses in a carriage 43. The carriage 43 may be mounted for horizontal movement from left to right, as viewed in Figs. 3 and 4, along a pair of guide shafts 44—44, as described in the copending application of H. J. Coventry. A pair of return springs 45—45 maintain the carriage 43 and, thus, the backing plate 27, normally in the extreme leftward position, as shown in Fig. 4 when the cutting operation is not in progress.

As seen in Fig. 2, a roller 46 is secured to the backing plate 27 and is disposed in the path of a booster arm 47, which is secured to a hub 49 of the drum 28 for rotation therewith.

The booster arm 47 is mounted in advance of the cutting blades 22 and 23 so that it contacts the roller 46 shortly before the blades 22 and 23 are moved by the cutter reciprocating means 85 into cutting engagement with the tacky strip 13.

The booster arm 47 pushes the roller 46 to the right, as viewed in Fig. 3, which causes the backing plate 27 and, thus, the carriage 43, to move to the right against the bias of the return springs 45—45. The booster arm 47 is designed to contact and push the roller 46 during the entire interval of contact between the blades 22 and 23 and the tacky strip 13.

The carriage 43 and, thus, the backing plate 27 will return, under the compulsion of the return springs 45—45, to their original position, as shown in Fig. 4, as the booster arm 47 passes over the roller 46, upon movement of the cutting blades 22 and 23 out of engagement with the tacky strip 13, upon completion of the cutting out of the portion 14.

A pair of curved, hold-down plates 51—51 may be secured to the periphery of the drum 28 so that they project outwardly therefrom a predetermined distance, as described in the copending application of H. J. Coventry. One of the hold-down plates 51—51 is disposed on each side of the blades 22 and 23, as seen in Fig. 2, to engage the backing sheet 12 on either side of the tacky strip 13 and clamp the backing sheet 12 to the backing plate 27 during the cutting operation. The hold-down plates 51—51 are so designed that, at their lowermost point of descent, they will come into slight contact with the movable backing plate 27 to depress it downwardly a slight distance against the upward biasing forces exerted by the mounting springs 42—42.

To assure that the blades 22 and 23 cannot cut the paper 12, the maximum radial extension of the blades 22 and 23 is adjusted so that when fully extended by the cutter reciprocating means 85, the cutting edges are exactly flush with the adjacent curved edges of the hold-down plates 51—51. Thus, even if the backing plate 27 should expand due to the heat of the tacky strip 13, or for any other reason, the hold-down plates 51—51 will move the backing plate 27 downward to position properly the advancing composite 21 so that only the tacky strip 13 can be severed.

Further, as disclosed in the copending application of H. J. Coventry, a pair of retractable stripping sleeves (not shown) may be mounted pivotally between the hold-down plates 51—51. Such stripping sleeves are designed, after completion of the cutting operation, to be extended to engage the remaining portions of the tacky strip 13 adjacent to the cutting blades 22 and 23 to strip such uncut portions away from the rising cutting blades 22 and 23, and to push such remaining portions back into adhering contact with the backing sheet 12.

Such stripping sleeves are made of suitable material such as Teflon, which has a low adherence to the tacky material as compared to the adhesion between the tacky material and the wax paper backing sheet 12.

*Cutting mechanism*

Referring now to Figs. 2 and 3, illustrating in detail an example of a suitable cutter reciprocating means 85, there is provided a reciprocable blade holder, indicated generally by the numeral 88, mounted within the interior of the hollow drum 28 for rotation therewith. The cutting blades 22 and 23 are secured, in spaced relationship to each other, to a base portion 89 of the blade holder 88 by a plurality of screws 90—90. The blades 22 and 23 extend from the base portion 89 of the blade holder 88 through a suitable aperture 91 in the periphery of the drum 28 so as to be radially reciprocable therewithin.

Four guide arms 92—92 are provided, extending radially inward from the base portion 89 of the blade holder 88 and fitting closely around an enlarged portion 93 of the stationary shaft 86. The blade holder 88 is both reciprocable and rotatable with respect to the enlarged shaft 93, the guide arms 92—92 being both slidable and rotatable with respect thereto.

A pair of cam rollers 96—96 are mounted rotatably on the inner ends of a pair of arms 94—94, which also extend radially inward from the base portion 89. The blade holder 88 is spring biased radially inward so that the cam rollers 96—96 ride on a pair of correspondingly spaced, generally circular cams 97—97 extending around the periphery of the enlarged shaft 93.

Four relatively heavy, biasing springs 98—98 are mounted between suitable recesses in the outer surface of the base portion 89 of the blade holder 88 and similar recesses in a flattened portion 99 of the inner periphery of the drum 28. The biasing springs 98—98 are designed to push radially inward the blade holder 88 to maintain the cam rollers 96—96 against the cams 97—97. A plurality of support pins 101—101 extend from both the blade supports 88 and the drum 28 to positions within the biasing springs 98—98, so that the blade holder 88 may rotate with the drum 28, as seen in Fig. 3, and yet be reciprocable with respect thereto.

Each of the circular cams 97—97 is provided with a raised camming portion 102, the apices of which are adjacent to the bottoms of the cams 97—97. The cam rollers 96—96 are designed to ride over the raised camming portions 102—102, as seen in Fig. 3, to extend radially outward the blade holder 88 against the forces exerted by the biasing springs 98—98, so that the cutting blades 22 and 23 sever completely through spaced portions of the tacky strip 13 to cut out the portion 14 therefrom, upon rotation of the drum 28 to its lowermost position.

Upon completion of the cut, the cam rollers 96—96 ride off of the raised camming portions 102—102 of the cams 97—97, thus causing the blades 22 and 23 to be retracted out of engagement with the tacky strip 13, as the blade holder 88 is reciprocated radially inward by the biasing springs 98—98 to its retracted or normal position.

As the blades 22 and 23 are retracted out of engagement with the tacky strip 13, the plug 37 of tacky material cut out therefrom is retained between the spaced cutting blades 22 and 23. The drum 28 and the blade holder 88 are then rotated 180° in a counterclockwise direction from the cutting position shown in Fig. 3 to the ejecting position shown in Fig. 4, the cutting blades 22 and 23 retaining the cutout plug 37 of tacky material therebetween.

*Ejecting mechanism*

As best seen in Figs. 2 and 4, a reciprocable plunger 107 is provided for ejecting the cutout plug 37 of tacky material from between the cutting blades 22 and 23. The plunger 107 fits closely within the space between the cutting blades 22 and 23 and is reciprocable therewithin to eject the plug 37.

The plunger 107 is mounted at the outer end of a reciprocable plunger holder 108, which is mounted slidably within an aperture 111 in the base portion 89 of the blade holder 88. The plunger 107 is secured to the outer end of the plunger holder 108 by means of a bolt 109.

A cam roller 112 is rotatably mounted at the inner end of the plunger holder 108. The plunger holder 108 is spring biased radially inward so that the cam roller 112 rides on a generally circular cam 113 extending around the periphery of the enlarged shaft 93, and spaced centrally with respect to the cams 97—97, associated with the cutter holder 88, as seen in Fig. 2.

The cam roller 112 is urged into contact with the cam 113 by a pair of relatively light biasing springs 114—114, mounted between suitable recesses in the inner surface of the base portion 89 of the blade holder 88 and similar recesses in the outer surface of a cross bar 116 of the plunger holder 108.

The circular cam 113 is provided with a raised camming portion 117 adjacent to the top thereof. The cam roller 112 is designed to ride over the raised camming portion 117, as seen in Fig. 4, to reciprocate radially outward the plunger holder 108 against the tensions exerted by the relatively light biasing springs 114—114, so that the plunger 107 extends beyond the cutting blades 22 and 23 to eject the plug 37 of tacky material, when the drum 28 is rotated to its uppermost position, 180° apart from the cutting position.

As the relatively light, ejector-biasing springs 114—114 are compressed during the ejecting step, they exert a force against the base 89 of the blade holder 88. Thus, the blade holder 88 will move a slight distance outward against the action of the relatively heavy, cutter-biasing springs 98—98. However, the light springs 114—114 are sufficiently long to permit the plunger 107 to eject the plug 37 from between the cutting blades 22 and 23 even though they have been extended slightly.

In this manner, the cutting blades 22 and 23 are cleared of the cutout plug 37 of tacky material and are thus in condition for cutting out a second portion 14 from the tacky strip 13 when the drum 28 is rotated 180°, back into cutting position. A stripping blade 118 of non-adherent material, such as Teflon, is provided adjacent to the top of the drum 28 to separate the ejected plugs 37—37 from the plunger 107 and to carry away the succession of ejected plugs 37—37, which may be fed back into the extruder 19 for reuse.

Operation

In the operation of the specific embodiment of the invention shown and described, the extruder 19 and the supply roll 17 are operated to feed the tacky strip 13 and the backing sheet 12 onto the upper surface of the moving conveyer belt 18, as best seen in Fig. 1. The tacky strip 13 adheres to the upper surface of the backing sheet 12 to form the advancing composite 21. The composite 21 advances through the improved cutting apparatus, designated generally by the numeral 10, the advancing composite 21 passing over the movable backing plate 27 and the conveyer belt 18 passing therebeneath. The extruder 19 may also supply the tacky cord 16 in spaced relationship to the strip 13, as seen in Fig. 1, the cord 16 bypassing the cutting apparatus 10.

Referring now to Fig. 2, the clutch 36 is engaged to rotate the drum 28 in predetermined synchronism with the movement of the conveyor belt 18. As the cutting blades 22 and 23 are carried by the rotating drum to their lowest position, as seen in Fig. 3, the cam rollers 96—96 ride on the cutter camming surfaces 102—102 to extend radially outward the blades 22 and 23 so that they engage and cut completely through spaced portions of the tacky strip 13 to cut out the portion 14 therefrom.

The cam rollers 96—96 then ride off of the camming surfaces 102—102 so that the cutter biasing springs 98—98 reciprocate the cutting blades 22 and 23 out of cutting engagement with the tacky strip 13, retaining the cutout plug 37 of tacky material therebetween as they move out of engagement with the tacky strip 13, thus completing the cutting operation.

Immediately prior to the cutting operation, the booster arm 47, seen in Fig. 2, contacts the roller 46 causing movement of the backing plate 27 and the carriage 43 to the right, as seen in Fig. 3, against the tension of the carriage-return springs 45—45, at substantially the same speed as the speed of advancement of the composite 21. Upon completion of the cutting operation, the booster arm 47 rides over the roller 46, and the backing plate 27 will be returned to its original position by the carriage return springs 45—45.

During the cutting operation, the curved hold-down plates 51—51 engage the backing paper 12 on either side of the tacky strip 13 and clamp the paper 12 to the backing plate 27, as best illustrated in Fig. 2. Further, the hold-down plates 51—51 depress the movable backing plate 27 against the upward forces exerted by the mounting springs 42—42 to assure that the advancing composite 21 is in the proper position for cutting. Since, when fully extended by the reciprocating means 85, the cutting edges of the blades 22 and 23 extend outwardly exactly as far as the adjacent curved edges of the hold-down plates 51—51, the blades 22 and 23 at their lowermost points, as seen in Fig. 3, will cut out completely the portion 14 from the tacky strip 13, but cannot contact the backing paper 12.

When the drum 28 has rotated 180° from the cutting position shown in Fig. 3 to the ejecting position shown in Fig. 4, the cam roller 112 will ride on the ejector camming surface 117 thereby extending radially outward the plunger 107 to eject the plug 37 of tacky material from between the cutting blades 22 and 23. The ejected plug 37 is stripped from the plunger 107 by the stripping blade 118 and is carried away.

The cam roller 112 then rides off the ejector camming surface 117 so that the ejector biasing springs 114—114 reciprocate the plunger 107 to its normal retracted position, as seen in Fig. 3. The cleared cutting blades 22 and 23 are then rotated 180° back into cutting position where a second portion 14 is removed from the tacky strip 13.

The cutout composite 24 passes off the backing plate 27 and back into engagement with the conveyer belt 18. As seen in Fig. 1, the cutout composite 24 may be cut to length with a second cutter 26, operated in predetermined synchronism with the cutting apparatus 10 and the conveyer 18, and then folded and packaged in a suitable manner.

It will be manifest that this invention is not limited to the specific details described in connection with the above embodiments of the invention but that various modifications may be made without departing from the spirit and scope thereof.

What is claimed is:

Apparatus for cutting out a portion from a strip of tacky material, which comprises a stationary shaft, a hollow rotatable drum having an aperture formed in the periphery thereof, means for rotating said drum coaxially about said stationary shaft, a reciprocable blade holder having an aperture therethrough mounted within said hollow drum for rotation therewith and for radial reciprocation with respect thereto, a pair of spaced cutting blades secured to outer portions of said blade holder and extending radially outward therefrom into the peripheral aperture of said drum, a pair of cutter cam rollers mounted rotatably on spaced inner portions of said blade holder, a pair of generally circular cutter cams extending around the periphery of said stationary shaft in aligned relationship with said cutter cam rollers, said cutter cams having aligned raised camming portions the apices of which are substantially in radial alignment with the point of closest approach of said cutting blades to the tacky strip, a plurality of cutter biasing springs mounted between outer portions of said blade holder and portions of the inner periphery of said hollow drum for maintaining said cutter cam rollers against said cutter cams, whereby, as said drum is rotated by said rotating means to carry said cutting blades to the point of closest approach to the strip of tacky material, said cutter cam rollers ride over the raised camming portions of said cutter cams to reciprocate said cutting blades radially outward through the peripheral aperture of said drum into and out of cutting engagement with the tacky strip to cut out a portion therefrom, the cutout portion being retained between said spaced cutting blades as they are reciprocated out of cutting engagement with the tacky strip, a plunger holder mounted for rotation with said drum and for radial reciprocation within the aperture in said blade holder, a plunger secured to said plunger holder and extending radially outward therefrom into the space between said cutting blades, a plunger cam roller mounted rotatably on an inner portion of said plunger holder, a generally circular plunger cam extending around the periphery of said stationary shaft in aligned relationship with said cam roller, said plunger cam being spaced between said cutter cams and having a raised camming portion out of alignment with the raised camming portions of said cutter cams, and a plurality of plunger biasing springs mounted between outer portions of said plunger holder and inner portions of said cutter holder for maintaining said plunger cam roller against said plunger cam, said plunger biasing springs being relatively light in comparison to said cutter biasing springs so that, as said drum is rotated further by said rotating means to carry said cutting blades away from the cutting position, said plunger roller rides over the raised camming portion of said plunger cam to extend said plunger between and beyond said spaced cutting blades to eject the cutout portion of tacky material from between said cutting blades.

References Cited in the file of this patent

UNITED STATES PATENTS

| | | |
|---|---|---|
| 687,905 | Seymour | Dec. 3, 1901 |
| 2,018,366 | Klause | Oct. 22, 1935 |
| 2,095,631 | Cumfer | Oct. 12, 1937 |
| 2,145,048 | Hagen | Jan. 24, 1939 |
| 2,423,791 | Nelson | July 8, 1947 |
| 2,433,058 | Mesaros | Dec. 23, 1947 |